United States Patent Office 3,079,402
Patented Feb. 26, 1963

---

3,079,402
CERO-CHROMONAMINO COMPOUNDS
Hans Voigt, Berlin-Waidmannslust, Germany, assignor to Dr. med. Hans Voigt Chem. Pharm. Fabrik, Berlin-Waidmannslust, Germany
No Drawing. Filed Mar. 16, 1962, Ser. No. 182,703
Claims priority, application Germany July 4, 1961
10 Claims. (Cl. 260—345.2)

The present invention relates to novel therapeutically valuable cero-chromonamino compounds, and to the method for their preparation. More particularly, the invention concerns cero-chromonamino complex organic compounds derived by the reaction of cerium salts and chromone or flavone bases.

In accordance with the invention there are prepared novel and heretofore undescribed cero-chromonamino complex compounds having the following general formula:

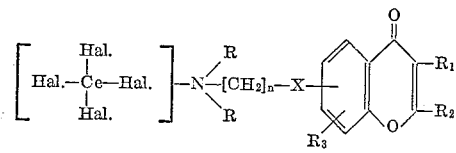

wherein Hal. signifies a halogen atom; R is hydrogen or alkyl containing from 1 to 4 carbon atoms, and wherein R—N—R can form a portion of a closed ring system, or where R may be an alkanol group; $R_1$ is hydrogen or alkyl containing from 1 to 3 carbon atoms; $R_2$ is alkyl containing from 1 to 3 carbon atoms or substituted or unsubstituted aryl; $R_3$ is hydrogen or hydroxyl or alkoxy, $R_3$ being in the 5 or 8 position; X is oxygen or a bond; and $n$ is an integer from 1 to 3.

In accordance with the invention, it has been found that the above class of new compounds may readily be prepared by the conversion of a suitable cerous salt with a chromone base or a hydrohalogenic acid salt of such base, and in favorable yields. The reaction can be carried out directly between the two starting substances by rubbing them together, or in an organic solvent medium, for a suitable period of time, at either ordinary temperature or at elevated temperature.

Cerous salts which may serve as starting materials include halide salts of trivalent cerium, such as, for example, the chloride, bromide, and fluoride, but cerous chloride is preferred. There may be employed as starting materials cerous carbonates, cerous oxide, or even ceric earths as well, which can be brought into solution with hydrohalogenic acids, followed by evaporation of this solution after determination of the equivalent amount of hydrohalogenic acid, which can be present in any desired excess. This solution may then be reacted with the equivalent amount of chromone base.

Chromone (or flavone) bases which are suitable for reaction with cerous salts in accordance with the invention include chromonamino compounds which are amino derivatives of chromone or flavone (2-phenylchromone), the amino group being on a methylene side chain. The amino nitrogen may be substituted by alkyl groups containing from 1 to 4 carbon atoms, such as methyl, ethyl, propyl, or butyl groups. The nitrogen substituents may also form a closed ring system, such as a piperidine, morpholine, or pyrrolidine ring. There may also be substituted on the nitrogen atom an alkanol group, especially a lower alkanol group, such as, for example, ethanol. The amino nitrogen may be connected to the chromone residue directly or via an oxygen atom, and such connection may be at the 7 or 8 position. Substituents on the chromone residue may include lower alkyl groups at the 2 or 3 positions, such alkyl groups containing from 1 to 3 carbon atoms. In the 2 position, a substituted aryl group such as tolyl, or an unsubstituted group, such as phenyl, may be attached. The chromone base reactants may thus include, for example, 7-(β-dialkylamino-alkoxy)-flavones, 7-(β-dialkylamino-alkyl)-2,3-dimethyl-chromones, 8-dialkylamino-methyl-7-hydroxy-flavones, 8-dialkylamino-methyl-7-alkoxy-flavones, 8-dialkylamino-methyl-7-hydroxy-2,3-dialkyl-flavones, and 8-dialkylamino-methyl-7-alkoxy-2,3-dialkyl-flavones.

Specific examples of chromonamino bases which are useful as starting materials for the formation of the cero-complexes of the invention include:

8-(N-methyl-N-hydroxyethyl-amino-methyl)-7-hydroxyflavone
8-(N,N-diethylamino-methyl)-7-hydroxyflavone,
8-(N,N-diethylamino-methyl)-7-hydroxy-2,3,-dimethylchromone,
7-(β-N,N,-dimethylamino-ethoxy)-flavone,
8-(piperidino-methyl)-7-hydroxyflavone,
8-(morpholino-methyl)-7-hydroxyflavone,
8-(N-diethylamino-methyl)-7-hydroxy-2-(p-methoxyphenyl)-chromone.

In accordance with the invention, it has been found that cero-complex compounds of the class described are characterized by extraordinary solubility in water, much more so than the hydrochloric acid salts of the chromonamines themselves. Moreover, the new complex compounds of the invention exhibit surprising and unexpected biological activity. The compounds of the invention, present in the organism in catalytic amounts, bring about a kind of oxidation-reduction process. It was known that cerous salts readily pass into the tetravalent state through oxidation. However, these ceric tetravalent forms readily give up oxygen and revert to the cerous form. This property of cerium, which is readily observable in vitro, can be of outstanding therapeutic value where it can be incorporated into organic substances which would activate the oxygen in biological systems, and which would provide tissues or organs or the blood with oxygen in a continuous manner. Thus, it was surprisingly found that compounds of cerium with flavones containing basic groups, exhibit this kind of biological activity. It was also found that the compounds of the invention possess this property even in dosages of 0.5 to 1 mg., whereas known cerium complex salts with organic bases, such as, for example, salts with β-dimethylaminoethanol and the like, or even organic salts of cerium, by themselves do not exhibit this behavior, nor to the flavones by themselves.

Tests made in vivo have shown the following results:
Venous blood deficient in oxygen has a relatively dark color characterized approximately as "maroon" (see Webster's New International Dictionary, Second Edition, Unabridged (1944), G. & C. Merriam Company, Springfield, Massachusetts, Color Chart D, Color No. 133). When this blood is treated with one of the cero-chromonamino complex compounds of the invention, or when one of these compounds is administered to the organism orally or intravenously, or inhaled as an aerosol, there is obtained from the same vein on the same side of the body from which the dark blood sample was previously taken, a blood which contains more oxygen and is of a lighter color, characterized approximately as "cardinal" (see Webster's, op. cit., Color Chart A, Color No. 5). This circumstance is attributable to the fact that the compound of the invention acts as an oxidation-reduction catalyst in biological transformations and serves to activate the enrichment of the blood with oxygen.

The same process also takes place in vitro. When dark venous blood has added to it a corresponding small amount of a compound of the invention, dissolved in isotonic salt solution, the blood absorbs oxygen more rapidly than a control sample of blood to which is added isotonic salt solution without the compound of the invention.

The foregoing effect of the new compounds of the invention takes place in vivo as well as upon oral, parenteral, or even upon transpulmonary administration, such as inhalation of an aerosol. The following table sets forth numerical results. Dosages were 1 mg. cerous chloride, and 1 mg. each of the compounds 8-(N-methyl-N-hydroxyethyl-aminomethyl)-7-hydroxy-flavone (I), the corresponding cerium complex (II), and finally the compound 8-(N-methyl-N-hydroxyethyl-amino-methyl)-7-hydroxy-ammonuium-cerium tetrachloride (III), administered orally. Five persons were subjects of the tests. The measured oxygen values are set forth in volume percent $O_2$ and $O_2\%$ of saturation, both before and after application. The determination was made approximately ½ hour after application on an empty stomach. The data given represents average values.

TABLE

| Test substance | Before application | | After application | |
| --- | --- | --- | --- | --- |
| | Vol. percent $O_2$ | Percent $O_2$, saturation | Vol. percent $O_2$ | Percent $O_2$, saturation |
| Control | 8 | 41 | 7 | 38 |
| 1 mg. cerous chloride | 8 | 37 | 8 | 38 |
| 1 mg. I | 6 | 25 | 5 | 25 |
| 1 mg. II | 7 | 39 | 7 | 40 |
| 1 mg. III | 7 | 39 | 20 | 85 |

It will be seen from the table that the application of the new cerochromonammonium complex salts of the invention in dosages of 1 mg. leads to a significant increase in the oxygen content of venous blood, whereas no similar action takes place with the comparison substances.

The new compounds of the invention are indicated as therapeutic agents in blood oxygen deficiency conditions, such as, for example, respiratory failure, anoxia, dyspnea, and the like.

The following examples illustrate the preparation of the compounds of the invention, but are not to be regarded as limiting.

*Example 1*

24.6 g. of anhydrous cerous chloride are suspended in alcohol. To this suspension there is added an alcoholic solution of 32.5 g. of 8-(N-methyl-N-hydroxyethyl-amino)-7-hydroxyflavone. Then there is added an alcoholic solution of 4 g. of hydrochloric acid and the entire mass is heated to boiling for 30 minutes, so that everything is dissolved. Upon cooling there crystallizes out 7-hydroxy-8 - (N - methyl - N - hydroxyethyl - ammonium - methyl)-flavone-cerium tetrachloride in colorless crystals, yield 46 g. After evaporation of the mother liquor another 8 g. of the complex salt are obtained. M.P. 200–220° C., with decomposition; sintering starts at 140° C.

*Example 2*

32.7 g. of cerous chloride containing 7 mols. of water of crystallization are warmed with 32 g. of 8-(N-methyl-N-hydroxyethyl-amino-methyl)7-hydroxyflavone in about 200 ml. of alcohol and 10 ml. concentrated HCl until solution takes place. The mixture is then cooled and the complex salt is filtered off, and the mother liquor is evaporated to dryness in vacuo, so that a thick crystalline mass results. This is treated with a mixture of alcohol and acetone and filtered. Yield about 90%. M.P. 87–89° C. forming a liquid which at 128–130° C. forms bubbles, solidifies and which decomposes at 200–210° C.

When cerous chloride containing water of crystallization is employed as a starting material, the complex salt crystallizes with water of crystallization, so that the complex salt always melts below 100° C., loses water between 100–150° C., becomes solid and then decomposes at about 200° C. This is also the case with all the other chromonamino bases.

*Example 3*

24 g. of anhydrous cerous chloride are boiled with 35.9 g. of the hydrochloride of diethylamino-methyl-7-hydroxyflavone in absolute alcohol for 30 to 60 minutes until completely dissolved. The mixture is allowed to cool and treated with ether until turbidity appears, whereupon crystals separate. More ether is added and the crystallization is repeated. The compound 8-(diethylammonium-methyl)-7-hydroxyflavone-cerium tetrachloride separates out as colorless needles, M.P. 210–213° C.

*Example 4*

30 g. of 7-($\beta$-N-dimethylaminoethoxy)-flavone are heated with 37 g. of cerous chloride containing 7 mols. of water of crystallization in 150 ml. of alcohol containing 10 ml. of concentrated HCl (37%) until solution takes place, after which the solvent is evaporated in vacuo to half its volume. The mixture is allowed to crystallize, or else the entire solvent is evaporated. There is obtained tetrachlor-cero - 7 - ($\beta$-N,N-dimethyl-ammonium-ethoxy)-flavone, M.P. 108–110° C., resolidifying at 150° C., and decomposing at 220–230° C.

In analogous manner similar complex compounds are obtained from 8-diethylamino-methyl-7-hydroxy-2,3-dimethyl-chromone and like chromones, which carry basic substituents.

It will be understood that the above description of the present invention is susceptible to various modifications, changes, and adaptations, and the same are intended to be comprehended within the meaning and range of equivalents of the appended claims.

What is claimed is:

1. Cero-chromonamino complex compounds having the formula:

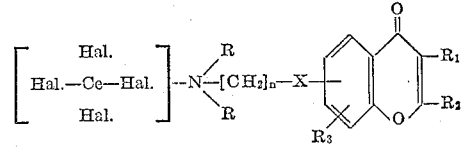

wherein Hal. is halogen; R is a member selected from the group consisting of hydrogen, alkyl containing from 1 to 4 carbon atoms, and lower alkanol, and a closed nitrogen ring formed by R—N—R; $R_1$ is a member selected from the group consisting of hydrogen and alkyl containing from 1 to 3 carbon atoms; $R_2$ is a member selected from the group consisting of alkyl containing from 1 to 3 carbon atoms, phenyl and tolyl; $R_3$ is a member selected from the group consisting of hydrogen, hydroxyl, and lower alkoxy; $R_3$ occupies a position selected from positions 5 and 8; X is oxygen of a carbon to carbon bond; and $n$ is an integer from 1 to 3.

2. 7-hydroxy-8-(N-methyl-N-hydroxyethyl-ammonium-methyl)-flavone-cerium tetrachloride.

3. 8-(diethylammonium - methyl) - 7 - hydroxyflavone-cerium tetrachloride.

4. Tetrachlor-cero-7-($\beta$-N,N-dimethyl-ammonium-ethoxy)-flavone.

5. Process for the production of cero-chromonamino complex compounds which comprises the steps of:

(a) reacting a cerous halide with a chromonamino base having the formula:

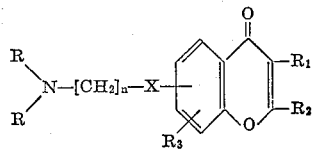

wherein R is a member selected from the group consisting of hydrogen, alkyl containing from 1 to 4 carbon atoms, and lower alkanol, and a closed nitrogen ring formed by R—N—R; $R_1$ is a member selected from the group consisting of hydrogen and alkyl containing from 1 to 3 carbon atoms; $R_2$ is a member selected from the group consisting of alkyl containing from 1 to 3 carbon atoms, phenyl and tolyl; $R_3$ is a member selected from the group consisting of hydrogen, hydroxyl, and lower alkoxy; $R_3$ occupies a position selected from positions 5 and 8; X is oxygen or a carbon to carbon bond; and $n$ is an integer from 1 to 3; and (b) recovering the formed complex compound.

6. The process of claim 5 in which the cerous halide is cerous chloride.

7. The process of claim 5 in which the reaction is carried out in an alcoholic organic solvent.

8. The process of claim 5 in which the chromonamino base is reacted in the form of its hydrohalogenic acid salt.

9. The process of claim 5 in which the reaction is carried out in a solvent comprising an alcoholic solution of hydrochloric acid.

10. The process of claim 5 in which the reaction is carried out under anhydrous conditions.

References Cited in the file of this patent

FOREIGN PATENTS 1,054,091 Germany _____ Apr. 2, 1959

OTHER REFERENCES

Yost et al.: The Rare-Earth Elements and Their Compounds, pages 51–69, John Wiley and Sons, Inc., New York (1947).